(12) United States Patent
Davies

(10) Patent No.: US 10,228,125 B2
(45) Date of Patent: Mar. 12, 2019

(54) SYSTEM FOR GENERATING ELECTRICAL POWER FROM LOW TEMPERATURE STEAM

(71) Applicant: Intex Holdings Pty Ltd, Payneham (AU)

(72) Inventor: Roger Davies, Collinswood (AU)

(73) Assignee: Intex Holdings Pty Ltd, Payneham, South Australia (AU)

( * ) Notice: Subject to any disclaimer, the term of this patent is extended or adjusted under 35 U.S.C. 154(b) by 0 days.

(21) Appl. No.: 15/570,567

(22) PCT Filed: Apr. 28, 2016

(86) PCT No.: PCT/AU2016/000152
§ 371 (c)(1),
(2) Date: Oct. 30, 2017

(87) PCT Pub. No.: WO2016/172761
PCT Pub. Date: Nov. 3, 2016

(65) Prior Publication Data
US 2018/0356091 A1    Dec. 13, 2018

(30) Foreign Application Priority Data

Apr. 29, 2015 (AU) ................................ 2015901526

(51) Int. Cl.
| | | |
|---|---|---|
| F03G 6/00 | (2006.01) |
| F22B 1/00 | (2006.01) |
| F22B 27/16 | (2006.01) |
| F01K 9/00 | (2006.01) |
| F03G 6/06 | (2006.01) |
| F01K 7/16 | (2006.01) |
| F01K 3/18 | (2006.01) |

(52) U.S. Cl.
CPC .............. *F22B 1/006* (2013.01); *F01K 9/003* (2013.01); *F03G 6/064* (2013.01); *F22B 27/16* (2013.01); *F01K 3/18* (2013.01); *F01K 7/165* (2013.01)

(58) Field of Classification Search
CPC ... F24J 3/02; F03G 6/001; F03G 6/065; F24S 30/455; H01L 31/022425; H01L 31/0693
See application file for complete search history.

(56) References Cited

U.S. PATENT DOCUMENTS

| | | | |
|---|---|---|---|
| 991,161 A | | 5/1911 | McHenry |
| 4,002,031 A | * | 1/1977 | Bell ........................ F03G 6/001 126/698 |

(Continued)

FOREIGN PATENT DOCUMENTS

JP    59107144    6/1984

*Primary Examiner* — Mark A Laurenzi
*Assistant Examiner* — Shafiq Mian
(74) *Attorney, Agent, or Firm* — Sand, Sebolt & Wernow Co., LPA

(57) ABSTRACT

A system for the generation of electrical power using a solar collector that heats water using solar energy. The heated water is stored in a first tank. A vessel is connected to the first tank through a pipe and includes a headspace within which the heated water is sprayed to thereby generate steam. The headspace pressure is lower than atmospheric pressure and the water not converted to steam is collected in a pool at the bottom of the vessel to be fed back into the first tank. The steam is fed to a partial admission turbine that drives an electrical generator.

5 Claims, 1 Drawing Sheet

(56) References Cited

U.S. PATENT DOCUMENTS

| | | | | |
|---|---|---|---|---|
| 4,050,445 | A | * | 9/1977 | Huse .................... F28C 3/08 |
| | | | | 126/590 |
| 4,213,303 | A | * | 7/1980 | Lane ..................... F03G 6/065 |
| | | | | 60/641.15 |
| 4,257,397 | A | * | 3/1981 | Gouyou-Beauchamps ................. |
| | | | | F24D 17/0068 |
| | | | | 126/587 |
| 4,280,328 | A | * | 7/1981 | Falconer ................ F03G 6/003 |
| | | | | 60/641.12 |
| 4,314,545 | A | | 2/1982 | Bowman |
| 4,388,916 | A | * | 6/1983 | Murdock ................ F22B 3/04 |
| | | | | 126/610 |
| 4,423,599 | A | * | 1/1984 | Veale ..................... F03G 6/065 |
| | | | | 126/584 |
| 7,735,323 | B2 | | 6/2010 | Bennett |
| 2012/0085635 | A1 | * | 4/2012 | Haynes ................ B01D 1/0035 |
| | | | | 203/11 |
| 2014/0026571 | A1 | * | 1/2014 | Valagam ................ F03G 6/005 |
| | | | | 60/641.8 |

\* cited by examiner

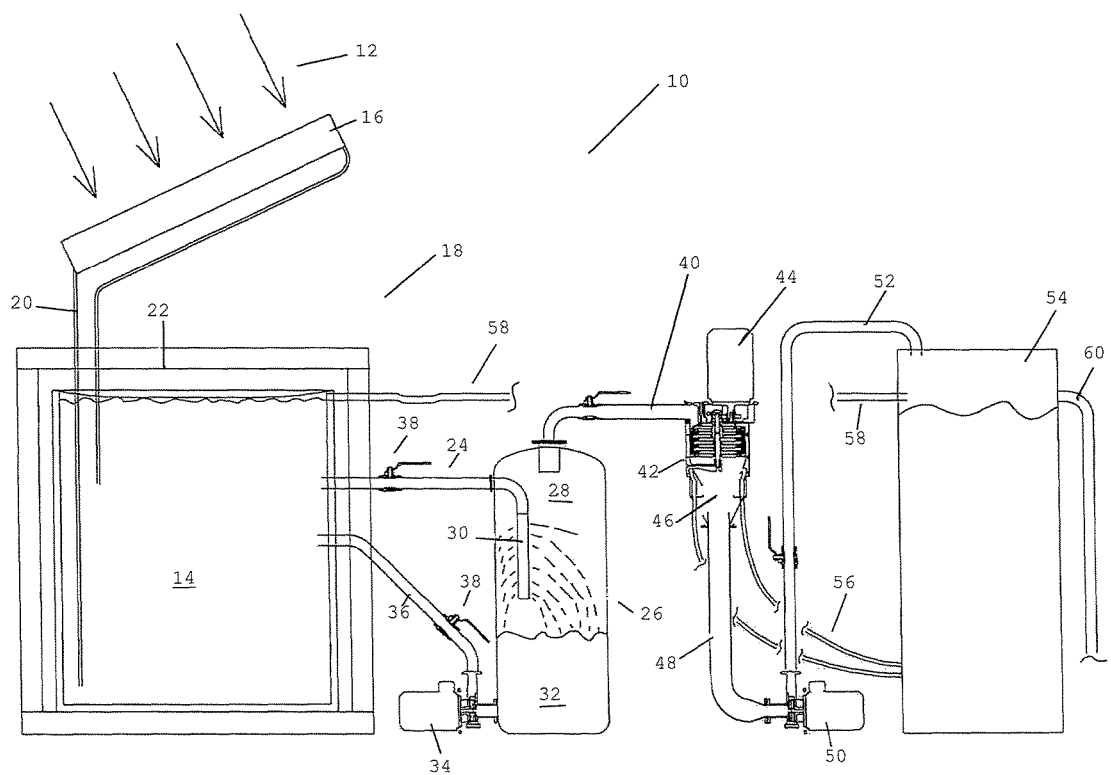

SYSTEM FOR GENERATING ELECTRICAL POWER FROM LOW TEMPERATURE STEAM

FIELD OF THE INVENTION

The present invention relates generally to a system for generating electrical power from low temperature steam using a partial admission axial flow turbine.

BACKGROUND

Electrical power is one of the fundamental requirements of modern society. Whilst electricity can be generated in many ways including photovoltaic cells, wind turbines or hydropower, most of the generation is accomplished using steam turbines to ensure that there is a steady continuous production of power. To generate steam large boilers are used to boil water with the heat produced by burning fossil fuels or nuclear fission.

Existing steam turbines are typically large, generating 100kW+ to overcome losses and be financially viable. Expansion of steam requires increase in flow area in multiple stage axial and radial designs, while high pressure, temperatures and rotational velocity limit materials selection. Large size and generally horizontal configuration requires that the shaft be supported along the axial direction. Rotating blade rows (rotors) must be separated by stationary nozzle rows (stators), increasing complexity of assembly.

The development of power generation devices over the years which use steam as a motive fluid has primarily been focused on reducing the monetary cost per MW-hour of electricity generated. To that end, improvements in steam turbine technology have been focused on increasing the output, steam/boiler temperature, unit reliability/availability, or a combination of these. These improvements generally add to the unit cost, necessitating an increase in power output to remain fiscally viable.

Solar heated water has been known to be used to create steam and be used as an auxiliary energy input to drive an axial turbine that is comprised of a stationary row of airfoils (typically referred to as "nozzles", "stators" or "vanes") that accelerate and direct the fluid flow to impinge against a rotating row of airfoil shapes (typically referred to as "buckets", "rotors" or "blades") which are connected to a shaft for delivering power output to a connected device.

When the fluid density is very high at turbine inlet then it is common practice to design the first stage (and possibly the first few stages) of a multi-stage turbine, with "partial admission". Partial admission refers to a stage design where nozzle passages are only provided for a portion (i.e., segment) of the 360 degree circumference. The main advantage of partial admission as used in conventional designs is that it enables the use of larger nozzle and blade passage heights (i.e., radial lengths) resulting in better efficiency due to reduced losses. This is especially important for high density flows where in a partial admission turbine the blade heights can be quite small.

In conventional turbines, particularly steam turbines, partial admission is only applied to the first stage (or first few stages) that operate with high density fluid. Subsequent stages cannot utilize partial admission because their operating pressure and density has been significantly reduced. As a result, a larger increase in nozzle and blade passage areas is required to compensate for the higher volume flow rate that occurs as the steam expands from inlet to exhaust. For these higher volume flow stages, full admission (360 degree) is typically required in order to achieve larger passage areas while maintaining blade heights within reasonable mechanical stress limits.

When the steam has passed through all of the stages any remaining steam needs to be condensed so it can be removed as water from the bottom of the turbine. Typically the condensed water may be reused in the steam generator.

It is an object of the present invention to provide a system for generating electrical power from low temperature steam for use with a partial admission steam turbine. For details of the separate components the reader is referred to co-pending applications titled:

(a) A method and apparatus for generating low temperature steam from hot water for use with a multi-stage axial flow turbine adapted to operate at low steam temperatures.
(b) A multi-stage axial flow turbine adapted to operate at low steam temperatures.
(c) A shaft for use with a multi-stage axial flow turbine adapted to operate at low steam temperatures.
(d) A condenser system for use with a multi-stage axial flow turbine adapted to operate at low steam temperatures

SUMMARY OF THE INVENTION

Therefore in one form of the invention there is proposed a system for the generation of electrical power including:
  a solar collector for heating water using solar energy, the heated water stored in a first tank;
  a vessel connected to the first tank through a first pipe and having a headspace within which the heated water is sprayed to thereby generate steam, the headspace pressure being lower than atmospheric pressure, the water not converted to steam collecting in a pool at the bottom of the vessel;
  a first pump pumping the water from the pool and into the first tank through a second pipe;
  a third pipe piping the steam to a partial admission turbine;
  a condenser located at the bottom of the turbine including a plurality of water outlets to spray water from a second tank into the condenser to cool the remaining steam into water;
  a second pump that pumps the water from the bottom of the turbine through a fourth pipe into the second tank; and wherein steam drives the partial admission turbine that drives an electrical generator.

In preference the flow rates through each pipe are determined by the size of the pipes.

In preference the flow rates through each pipe are controlled by individual valves.

In preference the flow rate of the fluid through the first pipe is at least initially smaller than the flow rate through the second pipe thereby causing a reduction in pressure in the headspace.

In preference the operating pressure in the headspace is around −14 psig.

In preference the system further includes an outlet pipe connected to the second tank to accommodate for any overflow.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

Reference will now be made, by way of example only, to the accompanying drawing.

FIG. 1 is a schematic view of the system to generate electrical power according to an embodiment of the invention.

DRAWING COMPONENTS

The drawings include items labeled as follows:
12 solar energy
10 power generating system
14 water
16 heating panels
18 storage tank
20 pipes
22 insulation
24 pipe
26 sealed chamber
28 headspace
30 shower head
32 pool
34 pump
36 pipe
38 valves
40 steam pipe
42 partial admission turbine
44 generator
46 bottom of turbine
48 condenser pipe
50 pump
52 pipe
54 tank
56 pipes
58 coupling pipe
60 overflow pipe

DETAILED DESCRIPTION OF THE INVENTION

The following detailed description of a preferred embodiment of the invention refers to the accompanying drawings. Wherever possible, the same reference numbers will be used throughout the drawings and the following description to refer to the same and like parts. As used herein, any usage of terms that suggest an absolute orientation (e.g. "top", "bottom", "front", "back", "horizontal", etc.) are for illustrative convenience and refer to the orientation shown in a particular figure.

However, such terms are not to be construed in a limiting sense as it is contemplated that various components may in practice be utilized in orientations that are the same as, or different than those, described or shown. Dimensions of certain parts shown in the drawings may have been modified and/or exaggerated for the purposes of clarity or illustration.

Turning now to the drawing is illustrated a power generating system 10 for the generation of power which in the most simplest explanation includes a means of heating water, generating steam from that hot water and using the steam in an electrical turbine to create electrical power.

In this embodiment solar energy 12 is used to heat water 14 using solar heating panels 16 the heated water that stored in a storage tank 18. The water is circulated between the tank 18 and the solar panels 16 through pipes 20. To minimize thermal loss the tank includes insulation 22.

Water 14 from tank 18 is fed via pipe 24 into sealed chamber 26. It is sprayed in the headspace 28 using a shower head 30 that typically has a plurality of apertures (not shown) along its length. The sprayed water collects in pool 32 at the bottom of chamber 26 where a pump 34 feeds the water back into storage tank 18 through pipe 36. Valves 38 can be used to control the flow of water through the pipes 24 and 36.

Either by controlling the size of the pipes 24 and 36 or by operating the valves 38 the flow rate through pipe 36 is initially greater than that through pipe 24 increasing the size of the headspace 28 in the chamber and thus causing a vacuum to be created in headspace 28. With atmospheric pressure being some 14.7 psia the pressure can in fact be reduced to −14 psig. The vacuum in the headspace 28 results in the sprayed water to turn into steam at much lower temperatures than 100 degrees Celsius.

The steam is then fed via steam pipe 40 into a partial admission turbine 42, the steam causing the turbine to rotate and spin a generator 44 to produce electrical power. Once the steam reaches the bottom 46 of the turbine it is showered with several streams of cooled water to ensure that all of the steam is condensed and the water is then extracted through condenser pipe 48 using pump 50 and fed through pipe 52 into tank 54. The water in the tank then recirculates back into the bottom 46 through pipes 56 with the flow rates through the pipe 48 and pipes 56 selected or controlled such that the vacuum in the turbine is also maintained at some −14 psig.

The reader will now appreciate that the sealed chamber 26 and the turbine 42 operate in a sealed environment and in a vacuum resulting in the water evaporating into steam at a temperature less than boiling temperature of water at atmospheric pressure and also assisting in the operation of the partial admission turbine.

The storage tank 18 and tank 54 can be fluidly coupled together through coupling pipe 58 with tank 54 also having an overflow pipe 60.

Whilst reference in the above has been made to using hot water heated by the sun, other sources of hot water may be used such as geothermal water or water heated by other means and that the vacuum can also be produced by other means besides water pumps.

In addition whilst the system is used to drive an electrical generator it may also be used to provide a source of rotational power.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus. Any discussion of the prior art throughout the specification should in no way be considered as an admission that such prior art is widely known or forms part of the common general knowledge in this field.

In the present specification and claims (if any), the word "comprising" and its derivatives including "comprises" and "comprise" include each of the stated integers but does not exclude the inclusion of one or more further integers.

The invention claimed is:

1. A system for the generation of electrical power including:

a solar collector for heating water using solar energy, the heated water stored in a first tank;

a vessel connected to the first tank through a first pipe and having a headspace within which the heated water is sprayed to thereby generate steam, a headspace pressure being lower than atmospheric pressure, the water not converted to steam collecting in a pool at a bottom of the vessel;

a first pump pumping the water from the pool and into the first tank through a second pipe;

a third pipe piping the steam to a partial admission turbine;

a condenser located at a bottom of the turbine including a plurality of water outlets to spray water from a second tank into the condenser to condense the remaining steam into water;

a second pump that pumps the water from the bottom of the partial admission turbine through a fourth pipe into the second tank;

wherein a flow rate of the water through the first pipe is at least initially smaller than a flow rate through the second pipe thereby causing a reduction in the pressure in the headspace; and wherein steam drives the partial admission turbine which drives an electrical generator.

2. The system as in claim 1 wherein the flow rates through each of the first pipe and the second pipe are determined by the size of the respective one of the first and second pipes.

3. The system as in claim 1 wherein the flow rates through each of the first pipe and the second pipe are controlled by individual valves.

4. The system as in claim 1 wherein an operating pressure in the headspace is around −14 psig.

5. The system as in claim 1 including an outlet pipe connected to the second tank to accommodate for any overflow.

* * * * *